United States Patent [19]

Nagata

[11] Patent Number: 5,585,418

[45] Date of Patent: Dec. 17, 1996

[54] GREENHOUSE FILM HAVING VARIABLE LIGHT DIFFUSION PROPERTIES

[75] Inventor: Harry H. Nagata, Brampton, Canada

[73] Assignee: AT Plastics Inc., Ontario, Canada

[21] Appl. No.: 490,670

[22] Filed: Jun. 15, 1995

[51] Int. Cl.$^6$ .............................. C09K 3/18; A01G 9/14; B32B 27/08

[52] U.S. Cl. .............................. 523/169; 47/17; 428/516; 428/520

[58] Field of Search .............................. 47/17 R, 17 MD, 47/17 I; 523/169; 428/516, 520

[56] References Cited

U.S. PATENT DOCUMENTS

| | | | |
|---|---|---|---|
| 4,423,164 | 12/1983 | Bar | 47/17 MD |
| 4,486,552 | 12/1984 | Niemann | 523/169 |
| 4,895,904 | 1/1990 | Allingham | 47/17 MD |
| 5,038,517 | 4/1991 | Talbott | 47/17 R |
| 5,212,903 | 5/1993 | Talbott | 47/17 R |
| 5,262,223 | 11/1993 | Sude et al. | 428/520 |

FOREIGN PATENT DOCUMENTS

| | | | |
|---|---|---|---|
| 0757882 | 4/1971 | Belgium | 47/17 I |
| 2528275 | 12/1983 | France | 47/17 I |
| 0090960 | 5/1983 | Japan | 47/17 MD |

*Primary Examiner*—Peter A. Szekely
*Attorney, Agent, or Firm*—Cushman, Darby & Cushman; IP Group of Pillsbury, Madison & Sutro

[57] ABSTRACT

An improved greenhouse assembly comprising in combination, greenhouse cover support means and a thermoplastic film cover supported by said cover means, the improvement comprising said film having outermost of the assembly a variable light diffuse surface which is substantially clear when wetted but has an enhanced degree of surface haze when dry. The greenhouse covering provide suitable variable light transmission into the greenhouse dependant on weather condition.

15 Claims, 2 Drawing Sheets

GREENHOUSE FILM HAVING VARIABLE LIGHT DIFFUSION PROPERTIES

FIELD OF THE INVENTION

This invention relates to thermoplastic greenhouse film having an outer layer with a variable light-diffuse surface and a greenhouse assembly comprising said greenhouse film.

BACKGROUND TO THE INVENTION

A greenhouse by its very nature is required to be closed during cold periods to contain the heat to create its growing environment. At high humidity inside the greenhouse, water condenses on the inside of the greenhouse roof or cover when the temperature of the roof or cover is reduced to the dew point or lower. A greenhouse film made from an olefinic polymer has a surface characteristic of low surface tension and thereby is hydrophobic.

One characteristic of a thermoplastic greenhouse film in a humid greenhouse environment is that the water condensate forms on the surface of the film as free droplets. This condition is known as "fogging" and creates two basis problems for the grower. First, the transmission of sunlight, an essential requirement for plant growth, is reduced. Second, the free droplets coalesce to form larger droplets which fall onto and may damage the crop below. The damage to the crop may be to the extent that the market value based on crop quality is reduced, and in the case of a speciality crop such as flowers, the damage can render the crop unmarketable.

One way to overcome the above problem of fogging is to spray the surface of the film exposed in the greenhouse environment with a substance which when dry forms a coating which increases the surface tension of the film surface so as to reduce the interfacial tension between the surface and water condensate. A commercial product which gives the above described effect is that material sold under the trademark "Sunclear", manufactured by Solar Sunstill Company, San Antonio, N. Mex., U.S.A. The result is that the water vapour condensate wets the film with a clear sheet of water. The water then runs continually down the curvature of the film, instead of the water droplets "raining" down upon the crop below. The enhanced transmission of light increases the crop growth while preventing crop damage.

A second way to overcome the above problem of fogging is to incorporate a surfactant additive into the polymer prior to the polymer being converted into a film. The additive functions in this utility by migrating to the surface of the film. When droplets of condensation form upon this film, the surfactant dissolves in the droplet water and reduces the surface tension of the water to cause the droplet to spread and coalesce with other droplets until the film is covered with a sheet of water. The sheeted water thus allow drainage of condensate continually down the curvature of the film. Examples of commercial surfactants are Atmer 184™ and Atmer 103™ sorbitan stearate (ICI Specialty Chemicals).

Growers in the horticultural field have often expressed the need for a greenhouse film which can change its light diffusion properties according to the weather, i.e. the amount and nature of sunlight falling on the greenhouse film covering the greenhouse crops. Ideally, a grower would like a greenhouse film which is clear to impinging sunlight on temperate days but which darkens under the effect of high, direct sunshine in order to prevent excess heat build-up within the greenhouse. To-date, such a film is not available.

A shade paint commercially available under the trademark "VariShade" (Solar Sunstill Company, San Antonio, N. Mex., U.S.A.) is often applied to the outer surface of a clear greenhouse film. The paint on the film is transparent to direct sunlight when wet, for example, from rain, but which is cloudy or hazy when the film surface is dry under direct sunlight conditions. "Varishade II" shade paint is recommended for use on film surfaces facing outside and inside of the greenhouse and is, in addition, removable. However, applying such a shade paint coating to an erected greenhouse film is not satisfactory because of the economic cost, time and labour involved in its application, which, to be effective must be uniformly and properly applied.

A commercially available film having high haze and light diffusion properties made from a polyethylene resin sold under the trademark MARLEX D252 (Philips Petroleum Company) is used in the packaging of materials by reason of its suitable physical strength properties. The high haze characteristic of this commercial film is known to be due to the nature of its surface properties, which surface characteristic can be avoided, if desired, by suitable co-extrusion manufacture. However, the surface characteristic of this material in possessing haze properties is neither harmful nor beneficial for the packaging duty required of the film.

One physical characteristic considered of a polyethylene greenhouse film covering a greenhouse is the difference between the degree of its light diffusion and its clarity. While a diffusion cover may transmit essentially the same amount of light, diffusion results in the light at any location within the greenhouse to be less intense generally than those areas exposed to direct sunlight. Diffusion of the light spreads more of it to effect better exposed leaf area without also providing plants under dark shadows. Clear film allows direct light to be transmitted which, in strong sunlight conditions can be harsh to growing crops. On the other hand, under low light intensity conditions, such as under cloudy skies, or in low sunlight conditions of winter, late fall and early spring clarity of the film allows the maximum possible intensity of light passage through to the plants.

There is, therefore, a need for a satisfactory greenhouse film having satisfactory variable light diffusion properties, and which does not involve manual application after the greenhouse film has been erected over a greenhouse.

SUMMARY OF THE INVENTION

It is an object of the present invention to provide a greenhouse assembly comprising a greenhouse film having intrinsic variable light diffusion properties which does not require the application of a shade of paint thereto to effect said light variation.

Accordingly, the invention provides in its broadest aspect an improved greenhouse assembly comprising in combination, greenhouse cover support means and thermoplastic film cover means supported by said cover means, the improvement comprising said thermoplastic film having a variable light diffuse surface which surface is substantially clear when wetted but has an enhanced degree of surface haze when dry.

Thus, the present invention provides for enhanced growing crop conditions in the present context of variable clarity greenhouse film due to appropriate wetting of the film to provide a variable diffuse and clarity surface property quality depending on the weather conditions.

In a further aspect, the invention provides an improved greenhouse assembly wherein the film having the innermost diffuse surface as hereinabove defined is used in conjunction with an outer second film comprising a polyolefin film. The invention also provides an improved greenhouse assembly wherein the film having the diffuse surface outermost as herein described is used in conjunction with an inner second film comprising a polyolefin film and an anti-fogging agent innermost of the assembly. Such polyolefin film containing anti-fogging agents are known and include, for example, polyethylene polymers, EVA (ethylene-vinyl acetate)copolymers, 1,2-polybutadienes, and blends thereof. Preferably the polyethylene is selected from the group consisting of LDPE (low density polyethylene) and LLDPE (linear low density polyethylene).

It will be apparent that in one aspect the invention resides in the discovery that a variable light diffusion surface thermoplastic layer provides the surface of the roof coveting a greenhouse with satisfactory light transmission characteristics. Thus, the nature of the second and, optionally, other layers of the multilayer film of use in the practice of the invention may be suitably selected by the skilled artisan based on the usual desired properties such as weight, ease of manufacture, durability, resistance to sunlight, and the like. It will be, thus, clear that the choice of polyolefin material of such subordinate layers is not crucial to this invention and resides within the skill in the art.

Preferably, the subordinate layer is formed of at least one polyolefin. By the term "polyolefin" as used in this specification and claims is meant the polyethylene, polypropylene and polybutadiene family of olefine polymers and copolymers. As examples, high density, low density and linear low density polyethylenes and 1,2-polybutadienes may be mentioned. The term "polyethylene" includes ethylene homopolymers, and copolymers of, such as vinyl acetate, acrylic acid, methyl methacrylate, butene, n-hexene, 4-methyl-1-pentene and octene polymers with ethylene and blends thereof.

The multilayered film of use in the practice of the invention may comprise (a) a plurality of distinct layers constituted as a plurality of distinct plies, (b) a laminate comprising at least two distinct films or plies adhered to each other, directly, or by means of an adhesive, (c) a co-extruded film produced by the self-adhesion of two or more films to each other under hot process conditions or (d) a co-oriented film, laminate or ply made by the cold drawing of a plurality of thermoplastic films, simultaneously in such close contact together that under the drawing step at the drawing temperature the films become intimately associated and unified into a single resultant film or ply while each undivided film is being uni-axially oriented.

The coextruded film of use in the invention may comprise two or more layers provided that a variable light diffusion thermoplastic layer comprises one outer layer.

Preferred multilayer films of use in the practice of the invention comprise an outer surface layer of Marlex D252 resin into which an antifog surfactant had been added so as to develop the antifog nature of the surface. Thus, this surface will be hazy when dry and clear when wetted.

In a further aspect, the invention provides that one surface film is clarified permanently with coextrusion. The coextruded film of use in the invention may comprise two or more layers having clear minimal body and surface diffusion (haze).

The layers of variable light diffusion thermoplastics and clear polyolefin may be, preferably, further stabilized for multiyear service life in a greenhouse environment. Stabilization additives, include, for example, antioxidants, UV stabilizers, UV absorbers and chelating agents in the quantities required for their specific application as would be readily recognized and determined by those skilled in the art.

In addition, coextruded film may contain additives to give further light diffusion, alteration of sunlight spectrum, infrared energy conservation and barrier properties.

Preferably, the film comprises a low density linear polyethylene.

A typical multilayered film of use in the invention is a coextrusion of polyethylene polymers having anti-fog agents, such as:

| | | |
|---|---|---|
| Low density linear polyethylene | MARLEX ® D252 | 1 mil |
| EVA copolymer | AT Plastics Inc. 1210 | 7 mil |
| Low density linear polyethylene | MARLEX ® D252 | 4.5 mil |
| Low density polyethylene | AT Plastics Inc. 605V | 1.5 mil |
| Low density linear polyethylene | MARLEX ® D252 | 4.5 mil |
| Linear low density polyethylene | Dowlex ® 2045 | 1.5 mil |

The multilayered films as described aforesaid may be readily made by processes known in the art, preferably by blown film extrusion. Film widths range, typically, from 1 m to 15 m. Most preferred are 2- and 3-layered coextruded films of a LDLPE outer layer with layers of LDPE, LLDPE, EVA copolymer or blends thereof.

In one preferred aspect, the multilayered film is installed and laid to cover the covering supports of a greenhouse structure as is conventional in the art but with the variable light diffusion film surface exposed to the inside atmosphere of the greenhouse and the clear coextruded layer remote from the greenhouse atmosphere. In a double skin air inflated greenhouse coveting system, the clear second skin is placed outermost and the variable haze film innermost.

On dry, hot sunny days with permitted high ventilation within the greenhouse, the inner surface will be dry and provide the maximum haze and diffusion.

With a prerequisite anti-fog additive, the inside layer will be wetted in situations where condensation in the greenhouse is permitted. This would be when the greenhouse is closed, sealed or the like to prevent heat loss and thereby also prevent the ventilation of moisture therefrom. This would be the situation on cool days. The resulting sheeting of condensate water on the anti-fog film surface will cause this layer to be clear to direct light transmission.

In tropical or semi-tropical geographic areas, the greenhouse cover may not be formed to provide total enclosure to conserve heat as in temperate areas but rather as a cover against damage from pelting rains. The multilayered film would be installed in this situation with the diffuse surface exposed to the outside. During hot sunny days or warm overcast days the outer surface will provide diffusion. On cold rainy days, the rain will clear the haze of the outer surface. This situation is akin to the use of "Varishade" shade paint which relies on rain wetting to improve clarity and transmission through the coating.

BRIEF DESCRIPTION OF THE DRAWING

In order that the invention may be better understood preferred embodiments will now be described by way of example only with reference to the accompanying drawing wherein.

DETAILED DESCRIPTION OF PREFERRED EMBODIMENTS OF THE INVENTION

The following examples illustrate multilayered, coextruded films according to the invention having the stated compositions, wherein the numerical amounts are % w/w.

Example A -
Two layers

| Layer 1: | Gauge 50 μm | |
| --- | --- | --- |
| | Marlex ® D252 low density polyethylene. | 97.9 |
| | Atmer ® 184 (ICI Specialty Chemicals). | 1.0 |
| | Chimassorb ® 944 (Ciba-Geigy) HALS. | 0.55 |
| | Tinuvin ® 328 (Ciba-Geigy) UV absorber. | 0.25 |
| | B900 (Ciba-Geigy) antioxidant. | 0.10 |
| | Erucamide slip agent. | 0.20 |
| Layer 2: | Gauge 175 μm | |
| | ATP 1210 (AT Plastics Inc.) | 97.9 |
| | Atmer ® 184 | 1.0 |
| | Chimassorb ® 944 | 0.55 |
| | Tinuvin ® 328 | 0.25 |
| | B900 | 0.10 |
| | Erucamide | 0.20 |

Example B -
Two layers

| Layer 1: | Gauge 125 μm | |
| --- | --- | --- |
| | Marlex ® D252 | 97.9 |
| | Atmer ® 184 | 1.0 |
| | Chimassorb ® 944 | 0.55 |
| | Tinuvin ® 328 | 0.25 |
| | B900 | 0.10 |
| | Erucamide | 0.20 |
| Layer 2: | Gauge 25 μm | |
| | Dowlex ® 2045 | 77.9 |
| | ATP 1081 | 20.0 |
| | Atmer ® 184 | 1.0 |
| | Chimassorb ® 944 | 0.55 |
| | Tinuvin ® 328 | 0.25 |
| | B900 | 0.10 |
| | Erucamide | 0.20 |

Example C -
Three layers

| Layer 1: | Gauge 50 μm | |
| --- | --- | --- |
| | Marlex ® D252 | 97.9 |
| | Atmer ® 184 | 1.0 |
| | Chimassorb ® 944 | 0.55 |
| | Tinuvin ® 328 | 0.25 |
| | B900 | 0.10 |
| | Erucamide | 0.20 |
| Layer 2: | Gauge 100 μm | |
| | ATP 1087V | 97.1 |
| | Atmer ® 184 | 2.0 |
| | Chimassorb ® 944 | 0.55 |
| | Tinuvin ® 328 | 0.25 |
| | B900 | 0.10 |
| Layer 3: | Gauge 50 μm | |
| | Dowlex ® 2045 | 77.9 |
| | ATP 1081 | 20.0 |
| | Atmer ® 184 | 1.0 |
| | Chimassorb ® 944 | 0.55 |
| | Tinuvin ® 328 | 0.25 |
| | B900 | 0.10 |
| | Erucamide | 0.20 |

Figure 1:
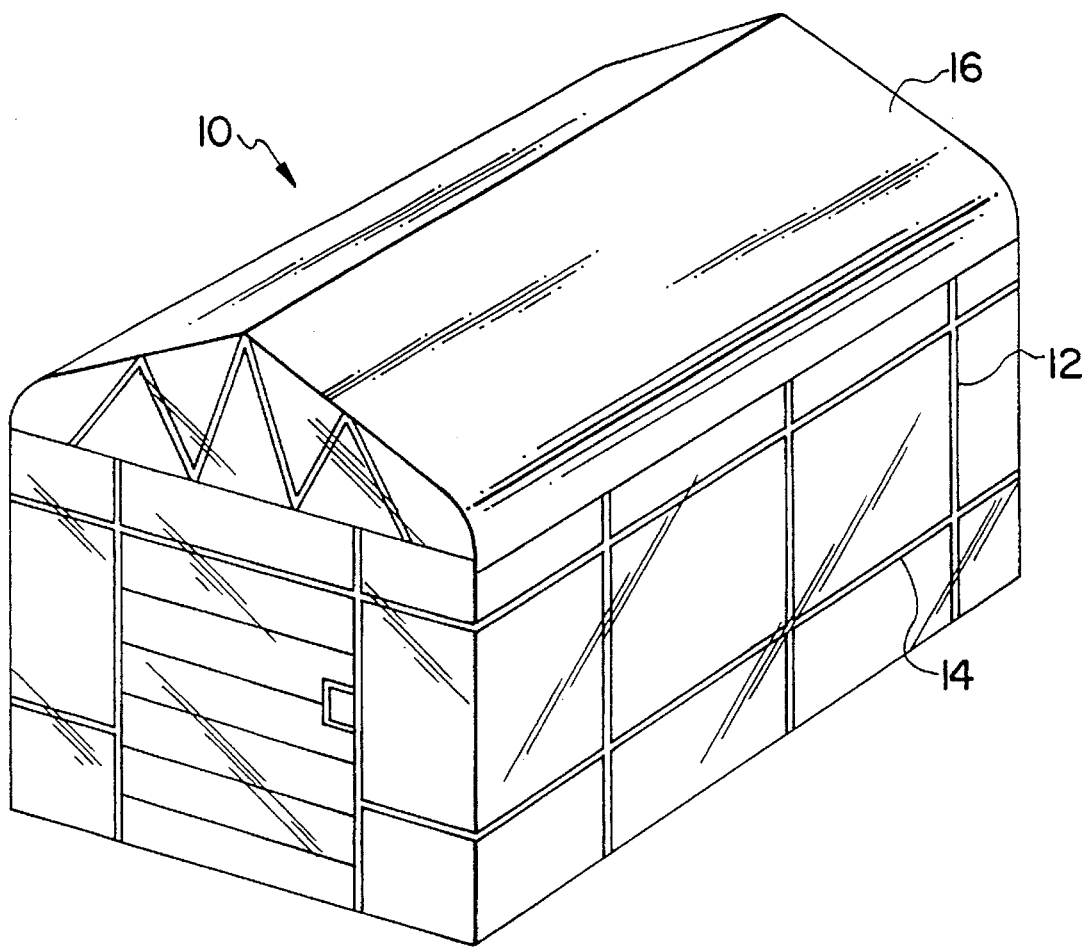
FIG. 1 represents a perspective view of an unrolled, unfolded film positioned on a greenhouse according to the invention.

With reference now to FIG. 1, wherein a greenhouse assembly shown generally as 10, has a plurality of roof support members 12 and side support members 4 to which is held a covering film 16. Film 16 is selected from multilayered films of the following construction:

| Low density linear polyethylene | MARLEX ® D252 | 1 mil |
| --- | --- | --- |
| EVA copolymer | AT Plastics Inc. 1210 | 7 mil |
| Low density linear polyethylene | MARLEX ® D252 | 4.5 mil |
| Low density polyethylene | AT Plastics Inc. 605V | 1.5 mil |
| Low density linear polyethylene | MARLEX ® D252 | 4.5 mil |
| Linear low density polyethylene | Dowlex ® 2045 | 1.5 mil |

Figure 2:
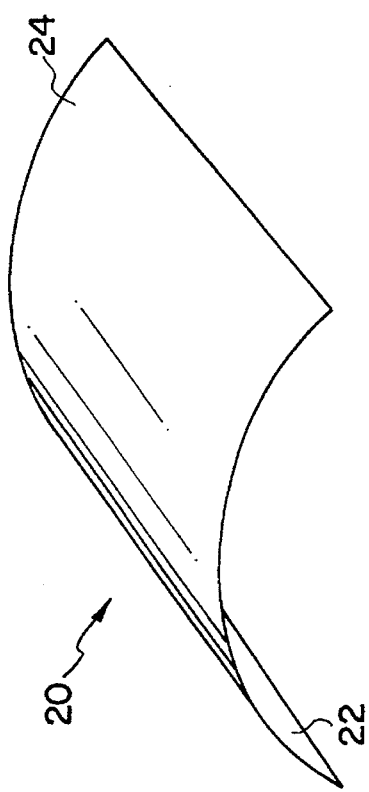
FIG. 2 is a diagrammatic representation in-part of a single skin greenhouse cover.

FIG. 2 is a diagrammatic representation in-part of a single skin greenhouse cover shown generally as 20 formed of a coextrude two-layer film having a composition as described in Examples A or B and a three-layer coextruded film of Example C. Layer 1 of Examples A, B and C shown as 22 in FIG. 2, faces innermost of the greenhouse atmosphere; whereas layer 2 of Examples A and B or layer 3 of Example C are shown in FIG. 2 as outermost layer 24 of assembly 10.

Figure 3:
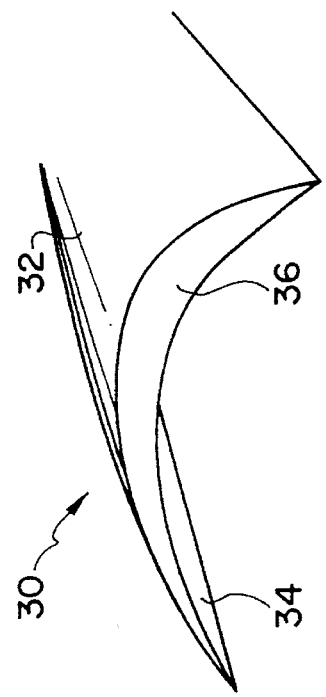
FIG. 3 is a diagrammatic representation in-part of a greenhouse double-skin cover.

FIG. 3 is a diagrammatic representation in-part of a greenhouse double-skin cover shown generally as 30 of an outer skin 32 and an inner skin 34 to define an inflatable air envelope enclosing air 36. Inner skin 34 is as described selected from Examples A, B and C wherein layer 1 is innermost to the greenhouse atmosphere. Outer skin 32 is a commercial clear low density polyethylene as is known in the art.

The above arrangement of film and greenhouse is of use in a free-standing greenhouse in a non-vented mode which permits the formation of condensation and wetting of the outer surface of inner most layer 1.

Figure 4:
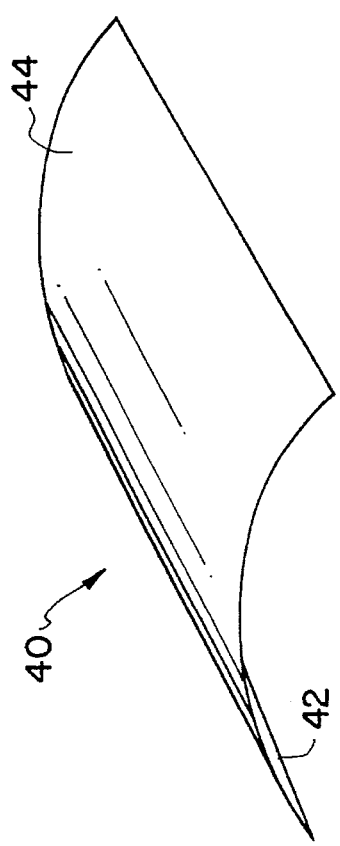
FIGS. 4 and 5 represent similar embodiments as FIGS. 2 and 3, but wherein layer 1 is disposed outermost of the assembly and subjected to the outside atmosphere.
Figure 5:
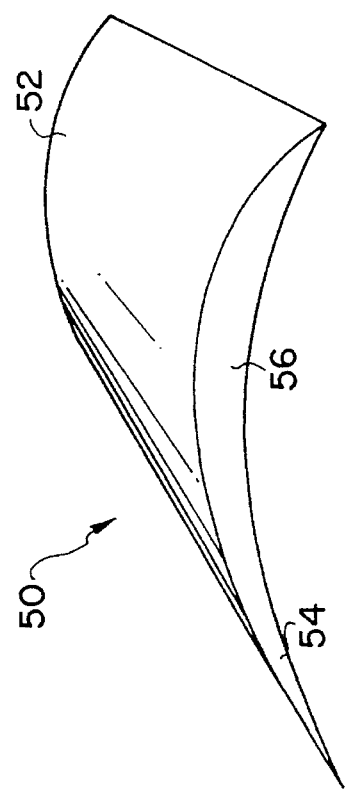

FIGS. 4 and 5 represent similar embodiments as FIGS. 2 and 3, but wherein layer 1 is disposed outermost of the assembly and subjected to the outside atmosphere. Such an arrangement is of use in a greenhouse fully-vented to prevent the rise of humidity. FIG. 4 shows generally as 40 a co-extruded two-layer single skin having layer 1 as 24 outermost and an inner layer of layer 2 or 3 of Examples A/B and C, respectively.

FIG. 5 shows generally as 50 a greenhouse double skin having an outer film 52 of Examples A, B or C wherein layer 1 is outermost to the atmosphere and inner film 54 of a commercial clear low density polyethylene which define an inflated air envelope 56.

EXPERIMENTAL

Haze and luminous transmittance of the following transparent plastics materials were measured following the ASTM-D1003-92 Standard Test Method for Haze and Luminous Transmittance of Transparent Plastics. This test method covers the evaluation of specific light-transmitting and wide-angle-light-scattering properties of planar sections of materials, such as essentially transparent plastic. A procedure is provided for the measurement of luminous transmittance and haze. Material having a haze value greater than 30% is considered diffusing. In this test method "haze" is defined as the cloudy or turbid aspect or appearance of an otherwise transparent specimen caused by light scattering from within the specimen or from its surfaces. It is measured as the percent of total transmitted light which, in passing through the specimen, deviates from the incident beam through forward scatter by more than 0.044 rad (2.5°) on the average. Luminous transmittance is the ratio of the luminous flux transmitted by a body to the flux incident upon it.

The haze measurements were made by a hazemeter. The luminous transmittance was obtained by placing a clear specimen at a distance from the entrance port of the integrating sphere. However, when the specimen was hazy, the total hemispherical luminous transmittance was measured by placing the specimen at the entrance port of the sphere. The measured total hemispherical luminous transmittance will be greater than the regular luminous transmittance, depending on the optical properties of the sample. With this test method, the specimen is necessarily placed at the entrance port of the sphere in order to measure haze and total hemispherical luminous transmittance.

The following test results were obtained in a comparison of a polyethylene film of a coextruded HDPE layer and a clear EVA sealant layer of use as a cereal liner having "frosted" haze vs a monolayer film extruded with Marlex D252 and having "frosted" haze appearance on both faces.

| Sample Position | Cereal liner | | Marlex D252 | |
|---|---|---|---|---|
| in Haze Meter | % Trans | % Haze | % Trans | % Haze |
| Marlex D252 monolayer film | — | — | 82.6 | 67.4 |
| Clear coex facing light | 82.6 | 80.6 | — | — |
| Marlex D252 wetted facing light | — | — | 84.6 | 48.5 |
| Liner, HDPE wetted** | 82.6 | 65.8 | — | — |
| Marlex D252 wetted both sides** | — | — | 91.0 | 17.7 |

**simulating antifog wetting

The test results show that the coextruded HDPE and EVA cereal liner does not improve in light transmission and only marginally on haze from 80.6% to 65.8% when simulating antifog wetting. On the other hand, it is clear the monolayer of Marlex D252 having haze on both surfaces also has reduced light transmission and high haze. When one surface is simulated to have coextrusion the light transmission is somewhat improved from 82.6% to 84.6% and haze improved from 67.4% to 48.5%. Surprisingly, when the second surface haze is overcome with simulated antifog wetting the light transmission increases a substantial amount to 91.0% along with a substantial decrease in haze to 17.7%. This latter condition is as good and as acceptable as some commercial greenhouse films.

Marlex® D252 low density, linear polyethylene film medium molecular weight resin has the following physical properties.

| Nominal Physical Properties of Marlex ® | | | | |
|---|---|---|---|---|
| PROPERTY | TEST METHOD | UNIT | | SI |
| Density | D1505 | g/cc | 0.923 | 0.922 |
| Melt Index, Condition 190/2.16 | D1238 | g/10 min | 0.3 | 0.25 |
| Condition 190/21.6 (HLM) | | | 21 | 15 |
| Typical Blown Film Properties,* 1 Mil (0.025 mm) | | | | |
| Dart Drop 26 in (66 cm) | D1709 | g | 500 | 500 |
| Elmendorf Tear | D1922 | | | |
| MD | | g | 150 | 150 |
| TD | | | 700 | 700 |
| Tensile Yield Strength 2 in (50 mm) per min | D882 | | | |
| MD | | MPa | 14 | 14 |
| TD | | | 12 | 12 |
| Ultimate Elongation | D882 | | | |
| 2 in (50 mm) per min | | | | |
| MD | | % | 500 | 500 |
| TD | | | 600 | 600 |

While certain preferred embodiments of the invention have been illustrated and described for purposes of the present disclosure, numerous changes in the arrangement and construction of elements thereof may be made by those skilled in the art which changes are encompassed within the scope and spirit of the present invention as defined by the appended claims.

I claim:

1. An improved greenhouse assembly comprising in combination, greenhouse cover support means and thermoplastic film cover means supported by said cover means, wherein said thermoplastic film comprises low density linear polyethylene having a variable light diffuse surface which is substantially clear with high light transmission when wetted but has a surface haze greater than 65% and reduced light transmission when dry.

2. An assembly as claimed in claim 1 wherein the variable light diffuse surface is exposed to the atmosphere within the greenhouse.

3. An assembly as claimed in claim 1 wherein the variable light diffuse surface is exposed outermost of the greenhouse.

4. An assembly as claimed in claim 1 wherein said thermoplastic film comprises a coextruded film comprising a first layer of said low density linear polyethylene.

5. An assembly as claimed in claim 4 wherein the said linear low density polyethylene has a density of about 0.92 g/cc.

6. An assembly as claimed in claim 4 wherein said film includes a second layer which is clear.

7. An assembly as claimed in claim 4 wherein said second layer comprises a polyolefin selected from the group consisting of a polyethylene polymer, EVA copolymer, 1,2-polybutadiene, hexene, octene and blends thereof.

8. An assembly as claimed in claim 7 wherein said polyethylene of said second layer is selected from the group consisting of low density polyethylene and linear low density polyethylene.

9. An assembly as claimed in claim 1 wherein said film comprises an antifog agent and a stabilization additive selected from the group consisting of antioxidants, UV stabilizers, and chelating agents in an effective stabilizing amount.

10. An assembly as claimed in claim 4 wherein at least one of said first layer and said second layer comprises an antifog agent and a stabilization additive selected from the group consisting of antioxidants, UV stabilizers, chelating agents, IR absorbers and white reflective pigments in an effective stabilizing amount.

11. An assembly as claimed in claim 4 wherein said linear low density polyethylene film contains an antifog agent.

12. An assembly as claimed in claim 4 wherein said second layer comprises a plurality of coextruded layers of polyolefins, said plurality being an integer selected from 2 to 4.

13. An assembly as claimed in claim 1 further comprising a clear second greenhouse film adapted to form with said thermoplastic film a double layer air inflatable greenhouse covering.

14. An assembly as claimed in claim 13 wherein said second clear greenhouse film is innermost of the double layer air inflated greenhouse covering to the atmosphere within the greenhouse.

15. An assembly as claimed in claim 13 wherein said second clear greenhouse film is outermost of the double layer air inflated greenhouse covering to the atmosphere within the greenhouse.

* * * * *